US007734961B2

(12) United States Patent
Almoustafa et al.

(10) Patent No.: US 7,734,961 B2
(45) Date of Patent: Jun. 8, 2010

(54) DISTRIBUTED LOGGING APPARATUS SYSTEM AND METHOD

(75) Inventors: Ahmed M. Almoustafa, Tucson, AZ (US); Aaron S. Palazzolo, Tucson, AZ (US); Michael L. Taylor, Tucson, AZ (US); An T. Tran, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 485 days.

(21) Appl. No.: 11/743,015

(22) Filed: May 1, 2007

(65) Prior Publication Data

US 2008/0276130 A1 Nov. 6, 2008

(51) Int. Cl.
*G06F 11/00* (2006.01)

(52) U.S. Cl. .......................................... 714/47; 714/48

(58) Field of Classification Search .................. 714/47, 714/48

See application file for complete search history.

(56) References Cited

U.S. PATENT DOCUMENTS

| | | | | |
|---|---|---|---|---|
| 5,941,996 | A * | 8/1999 | Smith et al. | 714/47 |
| 6,173,418 | B1 * | 1/2001 | Fujino et al. | 714/20 |
| 6,353,902 | B1 * | 3/2002 | Kulatunge et al. | 714/712 |
| 6,373,383 | B1 * | 4/2002 | Arrowsmith et al. | 340/506 |
| 6,603,396 | B2 * | 8/2003 | Lewis et al. | 340/506 |
| 6,604,208 | B1 * | 8/2003 | Gosselin et al. | 714/4 |
| 6,684,265 | B2 * | 1/2004 | Graf | 710/18 |
| 6,697,970 | B1 * | 2/2004 | Chisholm | 714/48 |
| 6,707,795 | B1 * | 3/2004 | Noorhosseini et al. | 370/242 |
| 6,925,586 | B1 * | 8/2005 | Perrella et al. | 714/57 |
| 6,993,675 | B2 * | 1/2006 | Roddy et al. | 714/2 |
| 7,017,077 | B2 | 3/2006 | Lowen et al. | 714/20 |
| 7,086,034 | B2 | 8/2006 | Mihara | 717/124 |
| 7,240,244 | B2 * | 7/2007 | Teegan et al. | 714/38 |
| 7,562,139 | B2 * | 7/2009 | Wang et al. | 709/224 |
| 2001/0013107 | A1 * | 8/2001 | Lewis | 714/47 |
| 2006/0048004 | A1 * | 3/2006 | Kawashima | 714/23 |

* cited by examiner

*Primary Examiner*—Marc Duncan
(74) *Attorney, Agent, or Firm*—Kunzler Needham Massey & Thorpe

(57) ABSTRACT

An apparatus, system, and method are disclosed for distributed logging. Operating entities and associations between operating entities are registered in a registry by a logging entity registrar. An event notification monitor recognizes operating errors in operating entities. An aggregation module aggregates operating logs from sets of associated entities, which are then stored by a log set recorder.

14 Claims, 5 Drawing Sheets

500

510 520

| Logging Entity | Associated Logging Entities |
|---|---|
| A | B C D E F G |
| B | A C D |
| C | A B |
| D | A B |
| E | A F G |
| F | A E |
| G | A E H I J |
| H | I J |
| I | H J |
| J | A E G H I |

FIG. 5

DISTRIBUTED LOGGING APPARATUS SYSTEM AND METHOD

BACKGROUND OF THE INVENTION

1. Field of the Invention

The present invention relates to device activity logging. Specifically, the invention relates to apparatus, methods, and systems for distributed device activity logging.

2. Description of the Related Art

Troubleshooting operating errors in distributed systems presents a number of problems. Computing devices and programs typically maintain operating logs to assist in identifying the origin of operating errors. Because these logs can quickly grow to fill a significant amount of storage, they typically are maintained for a limited period of time before older entries are deleted to create storage for more recent entries. This creates a limited window of time in which operating errors can be identified, diagnosed, and remedied.

In distributed systems, normal operation of one operating entity may precipitate an operating error in another entity. In order to troubleshoot operating errors, IT staff must be aware of complex associations between computing devices and programs, and obtain the relevant operating logs within the limited time window mentioned. Identifying which devices and programs affect the operation of others can be a time-consuming process of trial and error in which operating errors must occur a number of times before the origin can be identified. The origin of operating errors that occur only infrequently may never be found.

SUMMARY OF THE INVENTION

From the foregoing discussion, it should be apparent that a need exists for an apparatus, system, and method that aggregates distributed device activity logs. Beneficially, such an apparatus, method, and system would facilitate troubleshooting of operating errors in sets of associated logging entities.

The present invention has been developed in response to the present state of the art, and in particular, in response to the problems and needs in the art that have not yet been fully solved by currently available device activity logging systems. Accordingly, the present invention has been developed to provide an apparatus, system, and method for distributed device activity logging that overcome many or all of the above-discussed shortcomings in the art.

In one version of the invention, an apparatus to collect distributed logs is provided with a logic unit containing a plurality of modules configured to functionally execute the necessary steps of collecting distributed logs. These modules in the described embodiments include a logging entity registrar that registers logging entities and associations between logging entities in a logging entity registry, a logging entity monitor that recognizes the occurrence of operating errors in logging entities, and a plurality of logging entities.

The apparatus, in one embodiment, is configured to maintain the locations of logging entities, the locations of log data, and access protocols in records in the logging entity registry. The apparatus is further configured, in one embodiment, to receive notification of operating error events. In a further embodiment, the apparatus may be configured to identify operating error events in logging entities.

A system of the present invention is also presented to collect distributed logs. In one embodiment, the system includes a logging data store, a log collector, a logging entity monitor, a plurality of logging entities, with at least one logging entity association. The system may also include a log aggregator that aggregates operating log data for storage in the logging data store.

A method of the present invention is also presented for collecting distributed logs. The method in one disclosed embodiment substantially includes the steps necessary to carry out the functions presented above with respect to the operation of the described apparatus and system. In one particular embodiment, the method includes registering logging entities, defining logging entity associations, receiving error notifications from logging entities, determining entities associated with the logging entity in which the operating error has occurred, and collecting activity log sets. The method also may include an operation to store the activity log set.

The present invention facilitates distributed device activity logging. These and other features and advantages of the present invention will become more fully apparent from the following description and appended claims, or may be learned by the practice of the invention as set forth hereinafter.

It should be noted that reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussion of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize that the invention can be practiced without one or more of the specific features or advantages of a particular embodiment. In other instances, additional features and advantages may be recognized in certain embodiments that may not be present in all embodiments of the invention.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which:

FIG. 5 is a block diagram illustrating one embodiment of a log association table of the present invention, with example data.

DETAILED DESCRIPTION OF THE INVENTION

Figure 1:
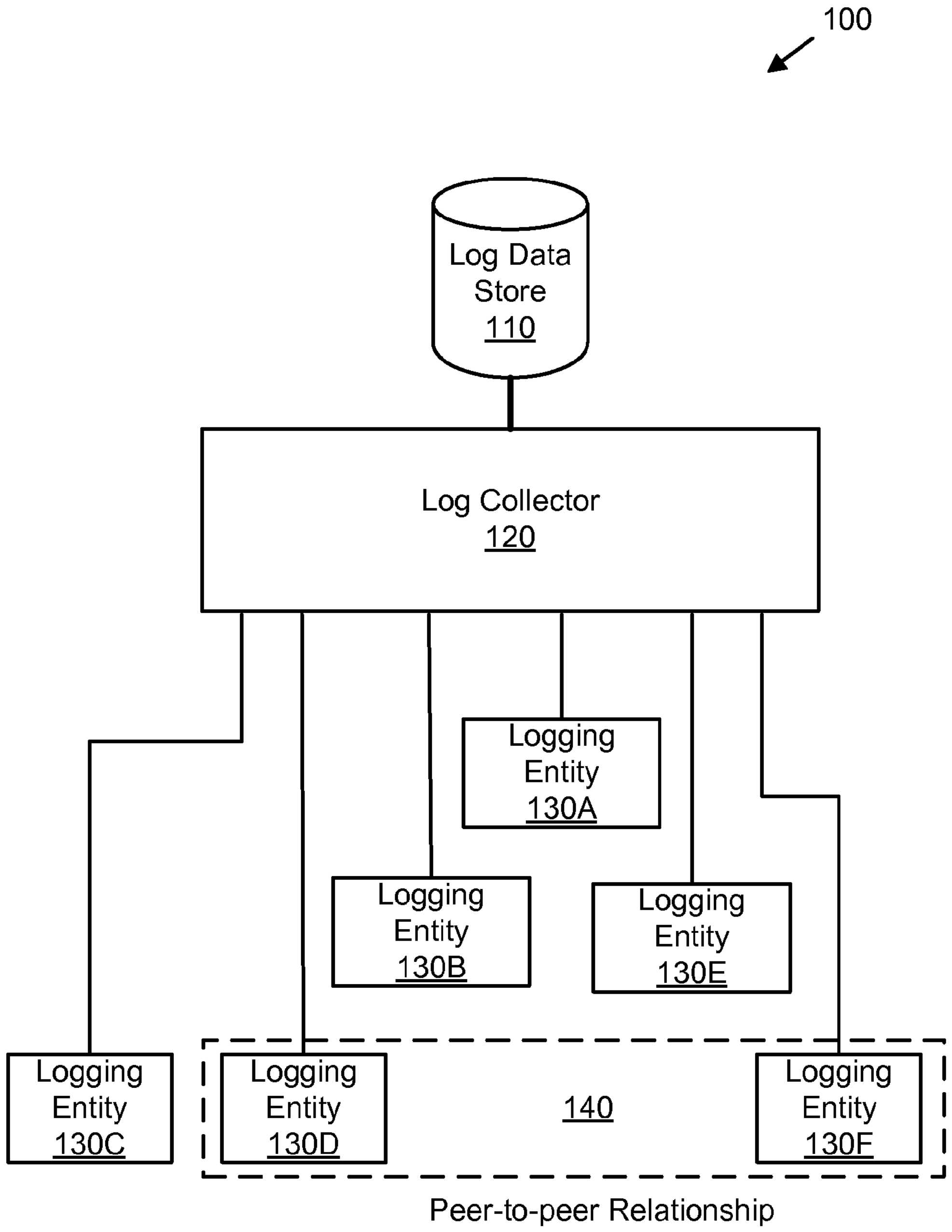
FIG. 1 is a block diagram illustrating a typical prior art log collection system.

It will be readily understood that the components of the present invention, as generally described and illustrated in the Figures herein, may be arranged and designed in a wide variety of different configurations. Thus, the following more detailed description of the embodiments of the apparatus, method, and system of the present invention, as represented in FIGS. 2 through 5, is not intended to limit the scope of the invention, as claimed, but is merely representative of selected embodiments of the invention.

Many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of executable code may, for instance, comprise one or more physical or logical blocks of computer instructions which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of executable code could be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network.

In the following description, numerous specific details are provided, such as examples of programming, software modules, user selections, network transactions, database queries, database structures, hardware modules, hardware circuits, hardware chips, etc., to provide a thorough understanding of embodiments of the invention. One skilled in the relevant art will recognize, however, that the invention can be practiced without one or more of the specific details, or with other methods, components, materials, and so forth. In other instances, well-known structures, materials, or operations are not shown or described in detail to avoid obscuring aspects of the invention.

The features, structures, or characteristics of the invention described throughout this specification may be combined in any suitable manner in one or more embodiments. For example, reference throughout this specification to “one embodiment,” “an embodiment,” or similar language means that a particular feature, structure, or characteristic described in connection with the embodiment is included in at least one embodiment of the present invention. Thus, appearances of the phrases “in one embodiment,” “in an embodiment,” or similar language throughout this specification do not necessarily all refer to the same embodiment and the described features, structures, or characteristics may be combined in any suitable manner in one or more embodiments.

The present disclosure sets forth means and methods for distributed log collection. In one version of the present invention, associations between logging entities are registered with a log aggregator. When an operating error occurs on one of the logging entities, the log aggregator obtains operating logs from each of the logging entities associated with the logging entity on which the error occurred. Collecting and storing the operating logs of each associated logging entity facilitates analysis of the causes of and possible remedies for operating errors.

FIG. 1 is a block diagram illustrating a typical prior art log collection system 100. The prior art log collection system includes a log data store 110, a log collector 120, and logging entities 130A through 130F. There is a peer-to-peer relationship 140 between logging entity 130D and logging entity 130F.

Each logging entity 130 establishes its own log reporting connection with the log collector 120. When an operating error occurs on a logging entity 130, the log collector 120 receives operation log data from the logging entity 130 and stores it in the log data store 110. Collection of log data from each logging entity 130 is performed independently, regardless of any operating relationship between logging entities 130. For example, logging entity 130B may be a subcomponent of logging entity 130A. An operation performed by logging entity 130B may cause an operating error in logging entity 130A. The logging entity 130A would transmit its operating log to the log collector 120. However, the logging entity 130B would not transmit operating log data to the log collector 120, because no operating error occurred on logging entity 130B. The log data store 110 would contain log data indicating that an error occurred, but not the operating log data that indicates the cause of the error.

In the prior art embodiment depicted in FIG. 1, a peer-to-peer relationship 140 exists between logging entity 130D and logging entity 130F. As with a hierarchical relationship, operations on logging entity 130D may cause an operating error on logging entity 130F. Logging entity 130F would transmit operating log data to the log collector 120, indicating that an error occurred, but because no error occurred on logging entity 130D, the cause of the error would not be stored in the log data store 110.

Figure 2:
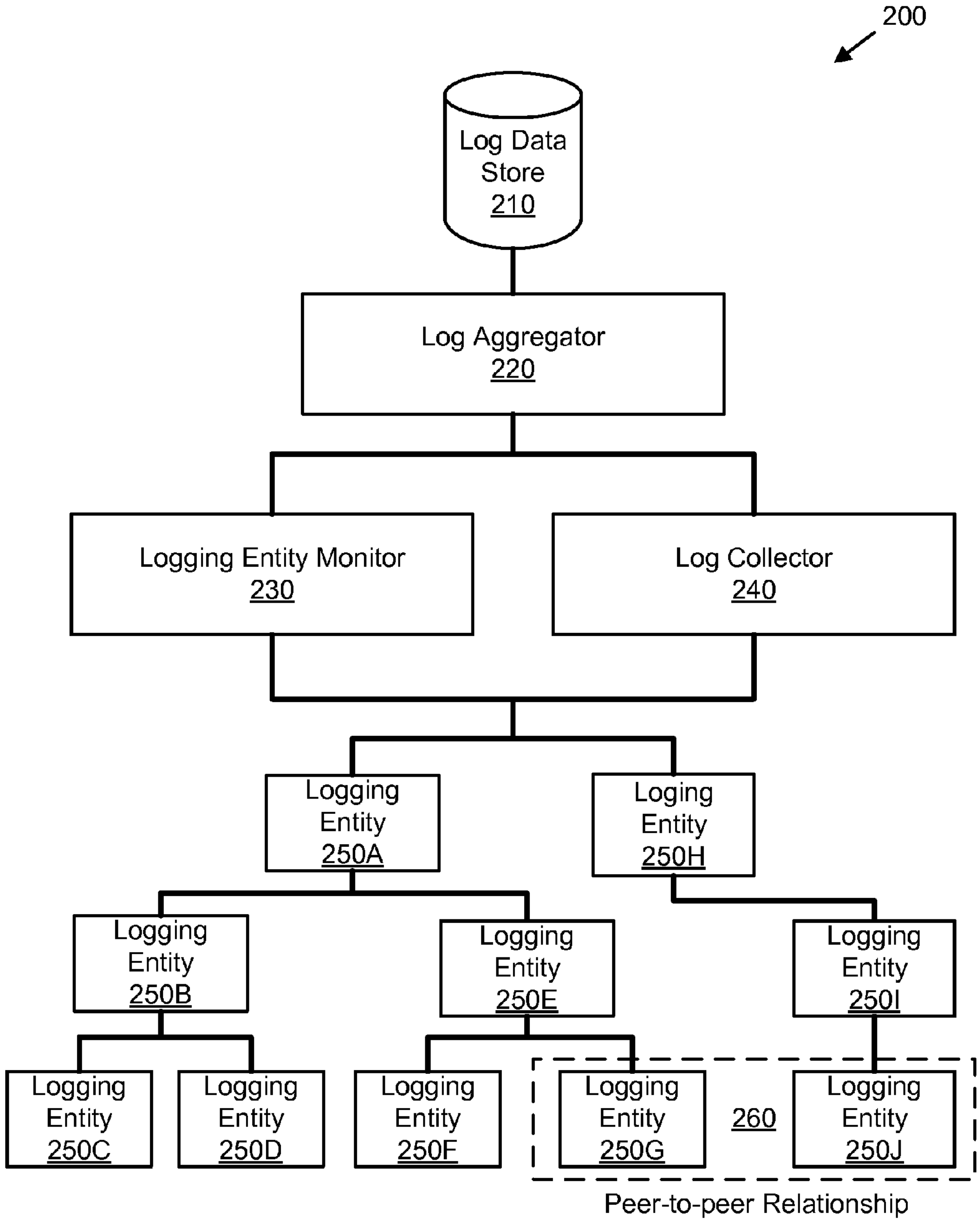
FIG. 2 is a block diagram illustrating a distributed log collection system in accordance with the present invention.

FIG. 2 is a block diagram illustrating a distributed log collection system 200 in accordance with the present invention. The distributed log collection system 200 includes a log data store 210, a log aggregator 220, a logging entity monitor 230, a log collector 240, and logging entities 250A through 250J. The distributed log collection system 200 facilitates collection of operating log data from logging entities 250 for storage in the log data store 210.

Logging entities 250 register with the log aggregator 220. Associations between logging entities are also established with the log aggregator 220. When an operating error occurs on a logging entity 250, the log collector 240 collects operating log data from the logging entity 250 on which the error occurred and from its associated operating entities 250. For example, in the embodiment depicted in FIG. 2, logging entities 250C and 250D are subcomponents of logging entity 250B. If an operating error occurs on logging entity 250B, the log aggregator 220 directs the log collector 240 to receive operating log data from logging entities 250B, 250C, and 250D. A peer-to-peer relationship 260 exists between logging entity 250G and logging entity 250J. If an operating error occurs on logging entity 250G, the log aggregator directs the log collector 250 to receive operating log data from logging entity 250G and logging entity 250J.

The log aggregator 220 receives operating log data from associated logging entities 250 and stores it in the log data store 210. In various embodiments, the log aggregator 220 correlates operating log data from a set of associated logging entities 250 according to time or operating relationships between the associated logging entities 250. In some embodiments, the logging entity monitor 230 monitors the operation of logging entities 250. If an operating error occurs on a logging entity 250, the logging entity monitor 230 initiates collection of operating log data from associated logging entities 250 by the log aggregator 220. In some embodiments, the logging entities 250 directly notify the log aggregator 220 of operating errors. In one embodiment, the log aggregator 220 is implemented on a device management console, such as an IBM Total Storage System Console (TSSC).

Figure 3:
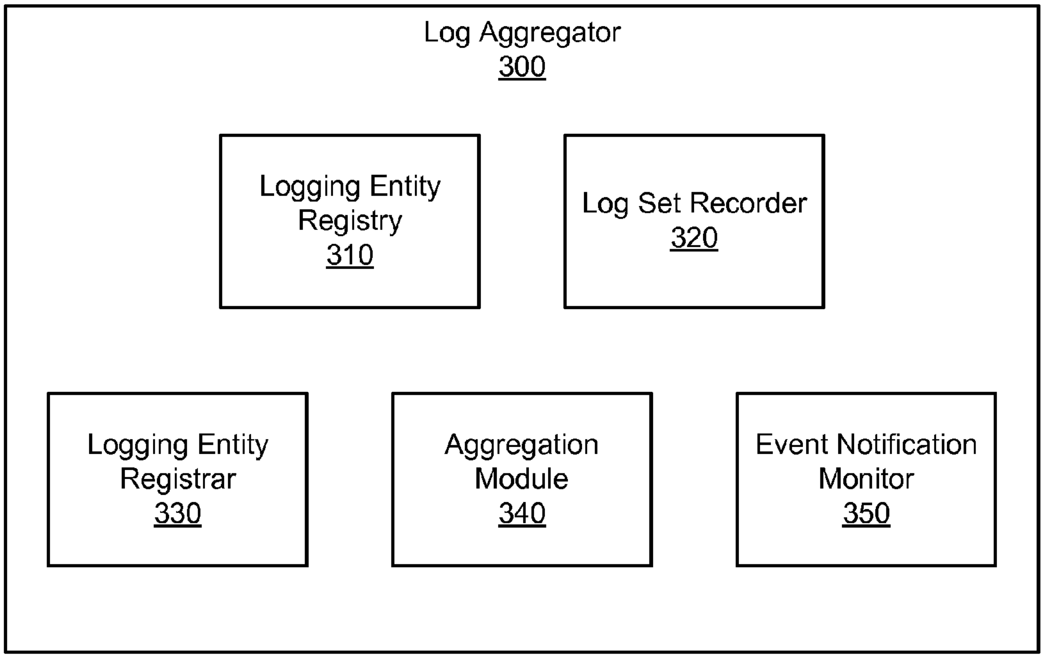
FIG. 3 is a block diagram illustrating one embodiment of a distributed log collection apparatus of the present invention.

FIG. 3 is a block diagram illustrating one embodiment of a distributed log collection apparatus 300 of the present invention. The distributed log collection apparatus 300 includes a logging entry registry 310, a log set recorder 320, a logging entity registrar 330, an aggregation module 340, and an event notification monitor 350. The distributed log collection apparatus 300 facilitates aggregation of operating log data from logging entities 250 for storage in the log data store 210.

The logging entity registrar 330 registers logging entities 250 in the logging entity registry 310. The logging entity registrar 330 may also register associations between logging entities 250 in the logging entity registry 310. The event notification monitor 350 receives notification of operating errors for the logging entities 250. When notification of an operating error is received, the aggregation module 340 obtains from the logging entity registry 310 the logging entities 250 associated with the logging entity 250 that is reporting an error. The aggregation module 340 receives operating log data from associated logging entities 250. In various embodiments, the aggregation module 340 correlates operating log data according to time and/or operating relationships between associated logging entities 250. The log set recorder 320 records operating log data from the associated logging entities 250 in the log data store 210.

Figure 4:
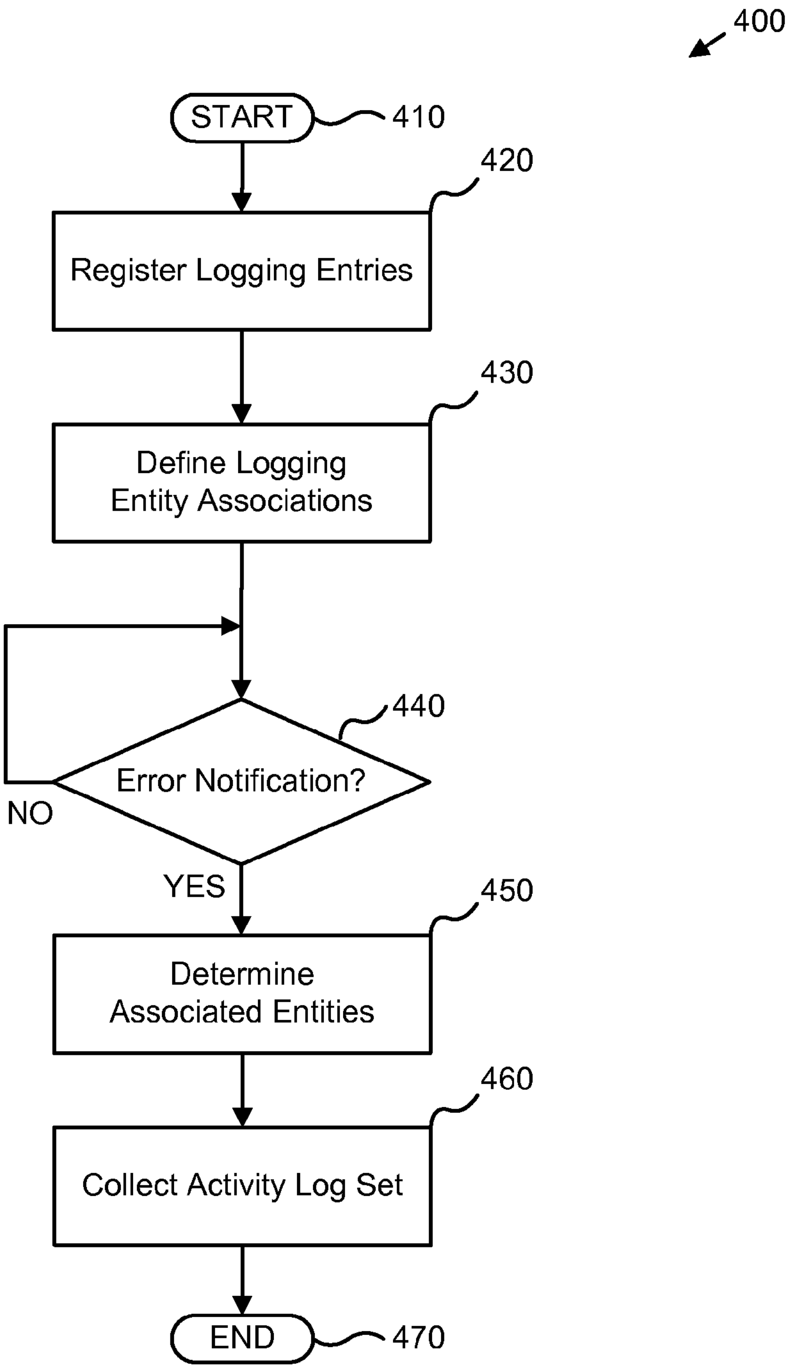
FIG. 4 is a flow chart diagram illustrating one embodiment of a distributed log collection method of the present invention.

FIG. 4 is a flow chart diagram illustrating one embodiment of a distributed log collection method 400 of the present invention. The distributed log collection method 400 includes a register logging entities operation 420, a define logging entities associations operation 430, an error notification test 440, a determine associated entries operation 450, and a collect activity log set operation 460. The distributed log collection method 400 facilitates collection of operation log data from logging entities 250 by the log collector 240, for aggregation by the log aggregator 220, and transmission to the log data store 210.

The register logging entities operation 420 registers logging entities 250 in the logging entity registry 310. The logging entity registrar 330 registers logging entities 250 in the logging entity registry 310. In some embodiments, each entry in the logging entity registry 310 contains the network address, the location of log data, and an access protocol for each logging entity 250.

The define logging entities associations operation 430 associates logging entities 250 in the logging entry registry 310. In one embodiment, each logging entity 250 reports its associations with other logging entities 250 to the logging entity registrar 330. In one embodiment, the logging entity registrar 330 determines associations between logging entities 250. In one embodiment, associations between logging entities 250 are defined by the user.

The error notification test 440 determines whether an operating error has occurred in an operating entity 250. In one embodiment, operating errors are reported to the event notification monitor 350 by the operating entity 250 on which the operating error occurred. In one embodiment, the logging entity monitor 230 determines when an operating error has occurred on a logging entity 250.

The determine associated entries operation 450 determines which logging entities 250 are associated with the logging entity 250 on which the operating error occurred. When the event notification monitor 350 receives notification of an operating error on a logging entity 250, the log aggregator 300 obtains the logging entities 250 associated with the logging entity 250 on which the error occurred from the logging entity registry 310.

The collect activity log set operation 460 collects operating logs from the set of associated logging entities 250. The aggregation module 340 receives operating log data from each of the operating entities 250 in the set of associated logging entities 250 from the log collector 240. In various embodiments, the aggregation module collates the operating log data according to time and/or the operating relationships between the associated logging entities 250. The log set recorder 320 records the aggregated operating logs in the log data store 210.

FIG. 5 is a block diagram illustrating one embodiment of a log association table 500 of the present invention, with example data. The log association table 500 represents entries in one embodiment of the logging entity registry 310. The log association table 500 includes a logging entity column 510, and an associated logging entities column 520. The log association table 500 facilitates determining which logging entities 250 are associated with each logging entity 250. One of skill in the art will appreciate that many other mechanisms are available for defining associations between entities.

In the embodiment of the log association table 500 depicted in FIG. 5, the logging entity column 510 contains an entry for each logging entity 250 registered in the logging entity registry 510. For each entry in the logging entity column 510, a corresponding entry in the associated logging entities column 520 contains a list of the logging entities 250 associated with the logging entity 250 in the logging entity column 510. The example data depicted in FIG. 5 represents the associations between the logging entities 250 depicted in FIG. 2.

The present invention facilitates distributed log collection. The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A computer program product comprising a computer readable medium having computer usable program code executable to perform operations for distributed log collection, the operations comprising:

registering a plurality of logging entities with a log aggregator, the log aggregator configured to store operating log data from the plurality of logging entities in a log data store;

defining logging entity associations for the plurality of logging entities;

receiving an error notification from a logging entity;

determining associated entities for the logging entity that caused the error notification; and collecting an activity log set comprising activity data for only the logging entity that caused the error notification and for each logging entity associated with the logging entity that caused the error notification.

2. The computer program product of claim 1, wherein defining logging entity associations comprises determining hierarchical relationships between logging entities.

3. The computer program product of claim 1, wherein determining associated entities comprises accessing a list of associated entities.

4. The computer program product of claim 1, wherein collecting an activity log set comprises collecting log entries from entities in an entity group.

5. The computer program product of claim 1, wherein the operations further comprise an operation to store the activity log set.

6. A system for distributed log collection, the system comprising:

a processor;

a plurality of logging entities configured to log operating data;

a log aggregator;

a logging entity registrar that uses the processor to register the plurality of logging entities with the log aggregator, the log aggregator configured to store operating log data from the plurality of logging entities, the logging entity registrar defining logging entity associations for the plurality of logging entities;

a logging data store configured to store the operating log data;

a log collector configured to collect operating log data from the plurality logging entities;

a logging entity monitor configured to monitor the operating status of logging entities the logging entity monitor configured to receive an error notification from a logging entity; and;

an aggregation module that determines entities associated with a logging entity that caused an error notification, the aggregation module receiving an activity log set comprising activity data for only the logging entity that caused the error notification and for each logging entity associated with the logging entity that caused the error notification.

7. The system of claim 6, wherein the logging data store is local to the log collector.

8. The system of claim 6, wherein the logging data store is external to the log collector.

9. The system of claim 6, wherein the logging collector is local to the logging entry monitor.

10. The system of claim 6, wherein the logging collector is external to the logging entry monitor.

11. An apparatus for distributed log collection, the apparatus comprising:

a logging entity registrar that uses a processor to register a plurality of logging entities with a log aggregator, the log aggregator configured to store operating log data from the plurality of logging entities in a log data store;

a logging entity registry configured to define logging entity associations for each of the plurality of logging entities;

a logging entity monitor configured to recognize operating error events in a logging entity, and an aggregation module that determines entities associated with a logging entity that caused an error notification, the aggregation module receiving an activity log set comprising activity data for only the logging entity that caused the error notification and for each logging entity associated with the logging entity that caused the error notification.

12. The apparatus of claim 11, wherein the logging entity registry comprises at least one logging entity record, the logging entity record comprising a logging entity location, a log location, and an access protocol.

13. The apparatus of claim 12, wherein the logging entity monitor is configured to receive notification of operating error events.

14. The apparatus of claim 13, wherein the logging entity monitor is configured to identify operating error events in logging entities.

* * * * *